United States Patent
Longhurst

(10) Patent No.: US 9,020,998 B2
(45) Date of Patent: Apr. 28, 2015

(54) EFFICIENT COMPUTATION OF DRIVING SIGNALS FOR DEVICES WITH NON-LINEAR RESPONSE CURVES

(75) Inventor: Peter Longhurst, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 976 days.

(21) Appl. No.: 13/123,568

(22) PCT Filed: Oct. 9, 2009

(86) PCT No.: PCT/US2009/060254
§ 371 (c)(1),
(2), (4) Date: Apr. 11, 2011

(87) PCT Pub. No.: WO2010/045125
PCT Pub. Date: Apr. 22, 2010

(65) Prior Publication Data
US 2011/0193610 A1    Aug. 11, 2011

Related U.S. Application Data

(60) Provisional application No. 61/105,382, filed on Oct. 14, 2008.

(51) Int. Cl.
*G06F 1/03* (2006.01)
*G09G 3/20* (2006.01)
*H04N 5/202* (2006.01)

(52) U.S. Cl.
CPC .. *G09G 3/20* (2013.01); *G06F 1/03* (2013.01); *G09G 2320/0276* (2013.01); *H04N 5/202* (2013.01)

(58) Field of Classification Search
USPC .......... 708/272, 290, 313; 348/674–677, 254; 341/75, 106
See application file for complete search history.

(56) References Cited

U.S. PATENT DOCUMENTS 5,175,621 A * 12/1992 Maesato ............... 348/676
5,321,797 A *  6/1994 Morton ................. 345/604

(Continued)

FOREIGN PATENT DOCUMENTS

CN   1056204   11/1991
CN   1526119    9/2004

(Continued)

OTHER PUBLICATIONS

J. Z. Chang, J. P. Allebach, and C. A. Bouman, "Optimal sequential linear interpolation applied to nonlinear color transformations", Proc. 1st IEEE Int. Conf. Image Processing, vol. 3, pp. 987-990, 1994.*

*Primary Examiner* — Chuong D Ngo
*Assistant Examiner* — Matthew Sandifer
(74) *Attorney, Agent, or Firm* — John W. Carpenter

(57) ABSTRACT

Apparatus comprising an input connected to receive an input signal, a lookup table comprising a plurality of input entries and first and second output entries for each input entry. The look up table receives the input signal and returns a lower input entry, an upper input entry, the second output entry for the lower input entry, and the first output entry for the upper input entry. A first subtractor subtracts the lower input entry from the input signal to produce a first difference. A second subtractor subtracts the input signal from the upper input entry to produce a second difference. First and second multipliers multiply the first and second differences by the first output entry for the upper input entry and the second output entry for the lower input entry, respectively, to produce first and second products. An adder adds the first and second products to produce an output signal.

10 Claims, 6 Drawing Sheets

(56) References Cited

U.S. PATENT DOCUMENTS

| | | | |
|---|---|---|---|
| 6,166,781 A * | 12/2000 | Kwak et al. | 348/674 |
| 6,833,876 B1 * | 12/2004 | Pirjaberi | 348/674 |
| 6,900,747 B2 * | 5/2005 | Lee | 341/106 |
| 7,111,028 B2 * | 9/2006 | Sato | 708/204 |
| 2003/0151531 A1 * | 8/2003 | Sasaki | 341/106 |
| 2007/0222707 A1 | 9/2007 | Thebault | |
| 2008/0136763 A1 * | 6/2008 | Ohashi et al. | 345/89 |

FOREIGN PATENT DOCUMENTS

| | | |
|---|---|---|
| CN | 101589610 | 11/2009 |
| JP | 7-220048 | 8/1995 |
| JP | 8-032987 | 2/1996 |
| JP | 2000-022973 | 1/2000 |
| JP | 2002-094794 | 3/2002 |
| JP | 2003-069857 | 3/2003 |
| JP | 2003-233812 | 8/2003 |
| JP | 2005-260405 | 9/2005 |
| JP | 2006173971 | 6/2006 |
| JP | 2007-184730 | 7/2007 |
| JP | 2008-005319 | 1/2008 |
| WO | 2007/022428 | 2/2007 |
| WO | 2008010023 | 1/2008 |

* cited by examiner

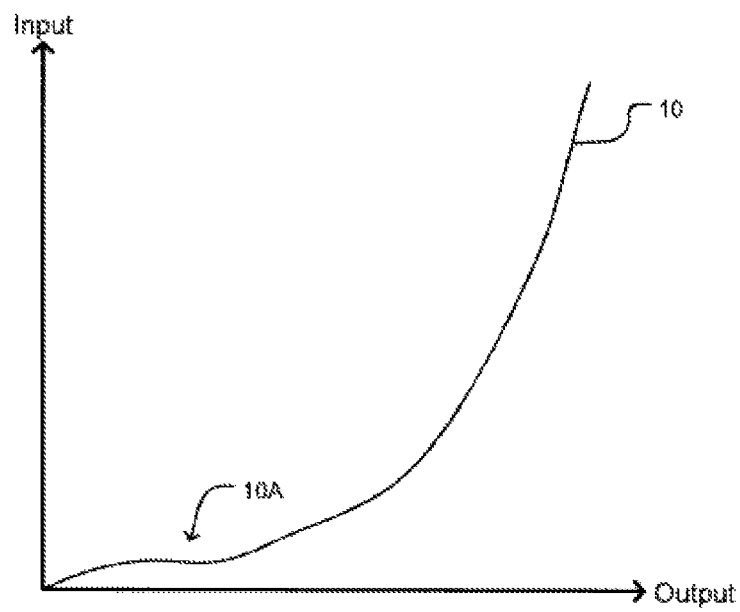

EFFICIENT COMPUTATION OF DRIVING SIGNALS FOR DEVICES WITH NON-LINEAR RESPONSE CURVES

TECHNICAL FIELD

The invention relates to signal processing. Certain embodiments have particular application to the processing of driving signals for devices with non-linear response curves.

BACKGROUND

Many devices controlled by electronic signals have non-linear responses, in that outputs produced by the devices are not linearly related to the input signals. For example, some devices such as Liquid Crystal Displays (LCDs) and Light Emitting Diodes (LEDs) have response curves which generally follow power or gamma type functions. Such non-linear responses must be accounted for when providing electronic signals for driving such devices.

There exist a number of prior art methods and systems which address non-linear responses. Examples include U.S. Pat. No. 6,166,781 to Kwak et al., U.S. Patent Application Publication No. 2007/0222707 to Thebault et al., and Japanese Patent Publication No. 2006-173971 to Yuji.

The inventor has determined a need for methods and systems which provide for efficient computation of driving signals for devices with non-linear response curves.

BRIEF DESCRIPTION OF DRAWINGS

FIG. 1 is a graph which depicts an example response curve for a device having non-linear characteristics.

FIG. 2 shows a look up table (LUT) which may be used to map inputs of non-linear response data which require a relatively large number of bits to be represented to outputs which may be represented using a lower number of bits.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1 shows a graph of an example non-linear response curve 10 of a device controlled with electronic signals. The vertical axis represents an input signal provided to control the device. The input signal may comprise, for example, a video signal. The horizontal axis represents a desired output signal to provide to a device driver. Curve 10 of FIG. 1 is intended to represent a generic example non-linear response curve, rather than a specific example response curve of a particular device.

In some situations, a relatively large number of bits may be required to represent the input signal, in comparison to the bit depth of the device to be controlled. For example, for a 10-bit image linearised by a gamma of 2.75, the lowest non-zero value of the input signal $((1/1023)^{2.75})$ may require 28-bits to be represented. In order to control a device such as an example LCD having a 10-bit depth, the 28-bit input signal must be mapped to a 10-bit output signal. In other situations, the input and output signals may have different numbers of bits. For example, some LEDs may be controlled using 12-bit signals.

FIG. 2 shows a lookup table (LUT) 12 having $2^N$ rows for mapping each possible value of an N-bit input signal to an output value having a desired bit depth. In the above noted example of mapping a 28-bit input signal to a 10-bit output signal, such a table would require 320 MB ($2^{28} \times 10$ bits). It is possible to reduce the size of the LUT by limiting the number of rows to the number of unique outputs (for example, $2^{10}$ in the case of a 10-bit output signal, which would require only $2^{10} \times 10$ bits or 1280 Bytes). Such a reduced-size LUT requires a search to find the correct entries corresponding to a received input signal. The search should be deterministic, in that it should always take the same amount of time to complete. For example, a simple binary search of a table having $2^{10}$ rows would require 10 comparisons to complete.

Figure 3A:
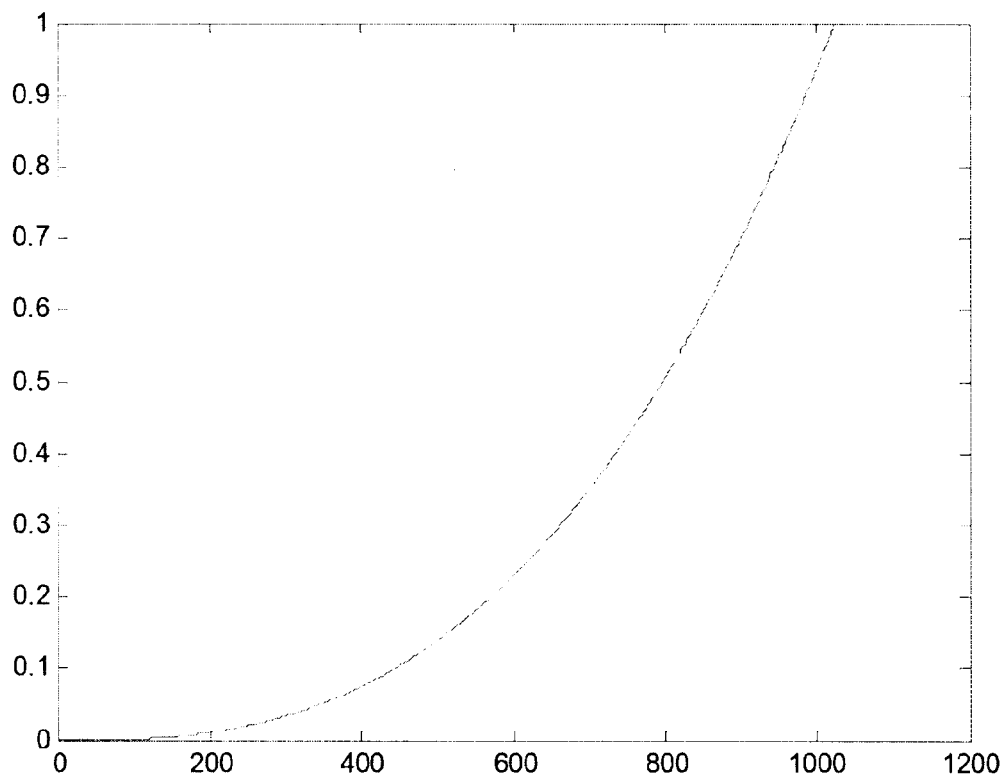
FIGS. 3A and 3B are graphs depicting a power function represented by 1024 points and 32 points, respectively.
Figure 3B:
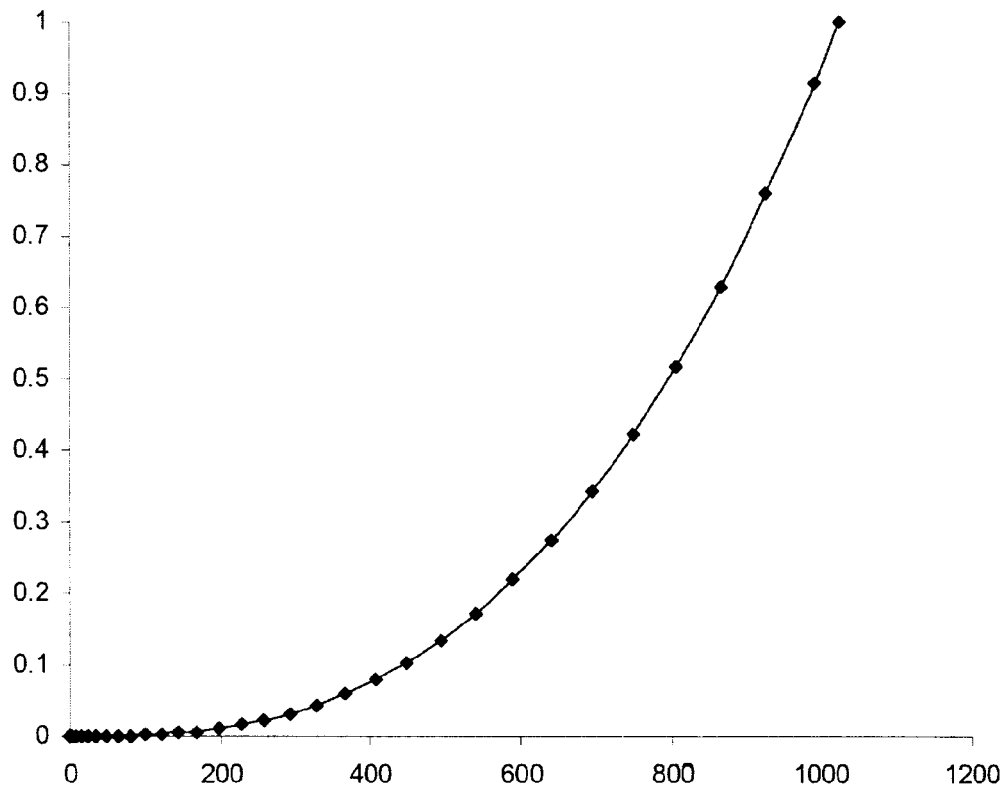

The size of the LUT may be further reduced in situations where the response curve increases monotonically, or at least generally monotonically, by expressing the response curve as a series of linear sections. For example, FIG. 3A is a graph of a power function created using 1024 points (which would require a table having 1024 or $2^{10}$ rows), and FIG. 3B is a graph of the same power function created using 32 points (which would require a table having only 32 rows), with minimal loss of accuracy. A number of points along the curve may be selected to be stored in the LUT, and intermediate values may be determined by linear interpolation. However, when such a table is applied in controlling a device, the divides required to perform linear interpolation are expensive to implement in hardware.

Figures 4, 6, 7:
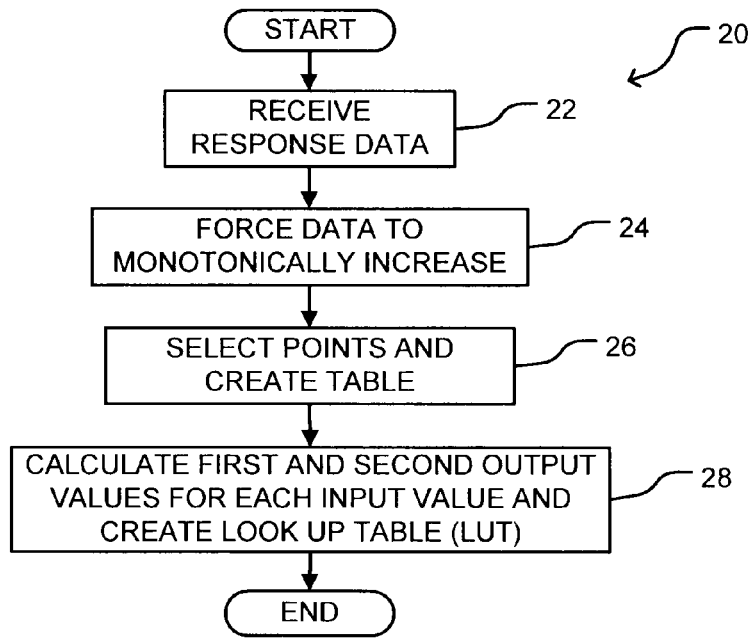
FIG. 4 is a flowchart illustrating an example method of creating a dual output LUT.
FIG. 6 shows an intermediate table created by the method of FIG. 4.
FIG. 7 shows a dual output LUT created by the method of FIG. 4.

FIG. 4 shows an example method 20 of generating a dual output LUT which may be applied to control a device without requiring any divides. Data representing a response curve is received at step 22. In some situations, the response curve may not be completely monotonically increasing (see, for example, decreasing region 10A of curve 10 of FIG. 1). For example, where the response curve is determined by measurement, noise may cause the curve to not be monotonically increasing in some sections, particularly at the lower end. If the data is not monotonically increasing, the data is altered to become monotonically increasing at step 24. For example, data stored in a table may be forced to be monotonically increasing by comparing each value in the table to the previous value, and if a value is lower than the previous value, finding the next higher value and creating a linear section to bridge the gap, as described further below. If there is no higher value, the lower value may be replaced with a value that is a predetermined amount higher than the previous value. For example, the lower value may be replaced with a value that is one percent (or some other percentage) higher than the previous value, or some other predetermined amount, which may depend on the size of the output.

Figure 5A:
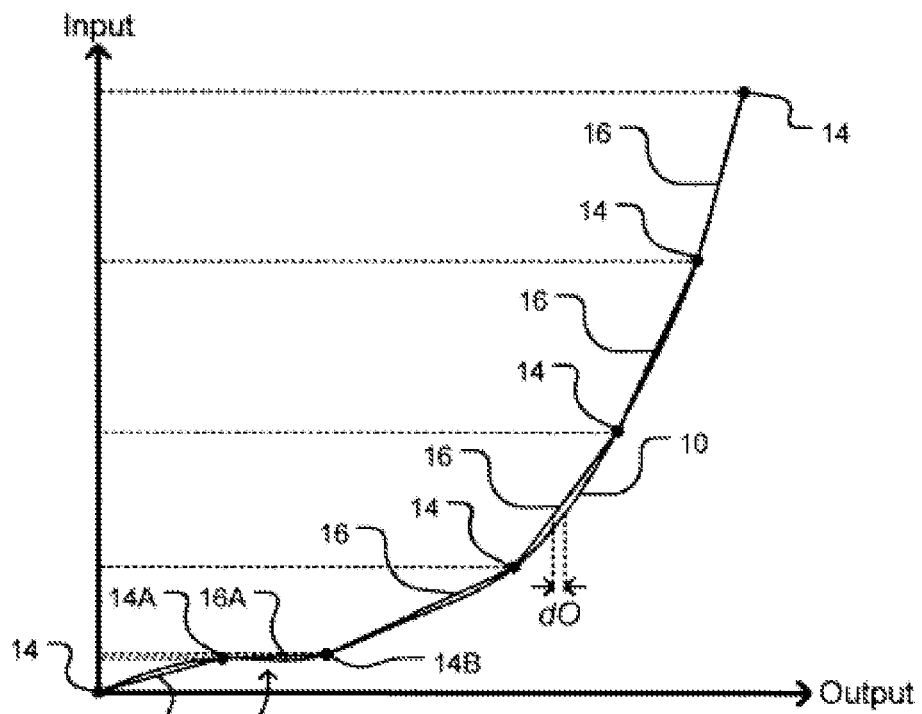
FIG. 5A is a graph which depicts a plurality of linear segments selected to approximate the example curve of FIG. 1.

At step 26, a number of points are selected to define the response curve, and an intermediate table is created using the input and output values of the selected points. With reference to FIG. 5A, a number of selected points 14 along curve 10 may be connected by linear sections 16 to approximate curve 10. It is noted that after point 14A, curve 10 is not monotonically increasing in region 10A, so the next point 14B is selected to have a higher value than point 14A, and linear section 16A bridges the gap between points 14A and 14B.

Figure 5B:
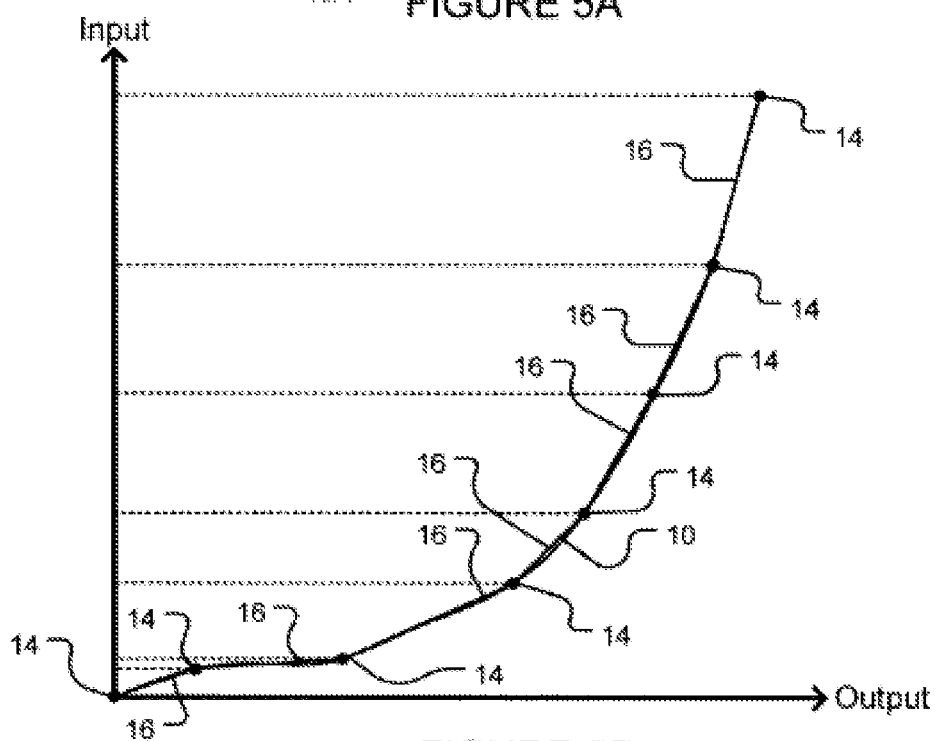
FIG. 5B is a graph similar to that of FIG. 5A wherein the number of linear segments has been adjusted.

Points 14 may be selected such that a difference dO between interpolated values along sections 16 and corresponding values along curve 10 is less than some threshold. In some embodiments, after one point 14 is selected, a candidate next point further along curve 10 may be selected and interpolated values may be calculated for the region between the point 14 and the candidate next point, and if dO is less than the threshold, the candidate next point may be moved further along the curve and the process repeated until dO reaches the threshold. For example, points 14 may be selected such that dO multiplied by a tolerance factor is less than the difference between an interpolated value and one value higher in the original data representing curve 10, and also less than the difference between an interpolated value and one value lower in the original data representing curve 10. The tolerance factor may initially be set to 1, and may be adjusted such that a desired number of points 14 are selected in order to create a table having a desired number of rows. For example, the tolerance factor may be increased if too few points are selected and may be decreased if too may points are selected. FIG. 5B shows a graph similar to that of FIG. 5A wherein the number of points 14 have been increased from seven to eight, in order to create a table having eight rows. If the tolerance factor cannot be adjusted to result in a table having the desired number of rows, the table may be trimmed if there are too many rows by removing one or more points 14 and merging sections 16 near the upper range of curve 10, or the table may be padded if there are too few rows by repeating values of the highest point 14 to create the desired number of rows.

In some embodiments, step 24 may be combined with step 26. For example, instead of first forcing the data to be monotonically increasing, points 14 may be selected such that each point 14 has input and output values not less than those of the preceding point 14. However, this may require that a larger portion of curve 10 be processed before selecting points 14.

Step 26 thus creates an intermediate table having a desired number of rows, such as, for example, table 30 shown in FIG. 6. Next, at step 28, first and second output values are calculated, as described below, for each input value of the intermediate table created in step 26, to produce a dual output LUT such as, for example, dual output LUT 32 of FIG. 7. For each input value, the first output value of the dual output LUT is calculated by dividing the corresponding output value of the intermediate table by the difference between the input value and the next lower input value, and the second output value is calculated by dividing the corresponding output value of the intermediate table by the difference between the input value and the next higher input value. As shown in FIG. 7, the first output for the first input value and the second output for the last input value will thus be empty.

The dual output LUT may be created at the time a device is manufactured or installed as a component of a larger product. Thus, the computationally-expensive divides may be precalculated in order to avoid the need to calculate divides on-the-fly during operation of the device.

Figure 8:
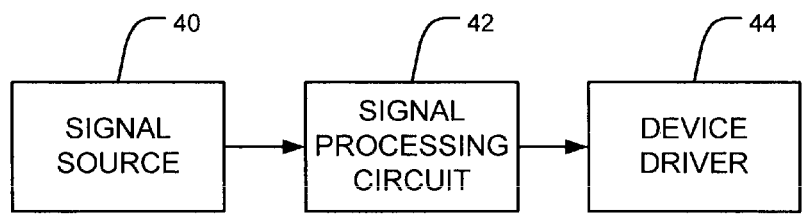
FIG. 8 shows an example system which includes a signal processing circuit which employs a dual output LUT.

In operation, a dual output LUT may be applied in a signal processing circuit such as, for example, signal processing circuit 42 of FIG. 8. As shown in FIG. 8, signal processing circuit 42 receives an input signal from a signal source 40, and provides an output signal to a device driver 44.

Figure 9:
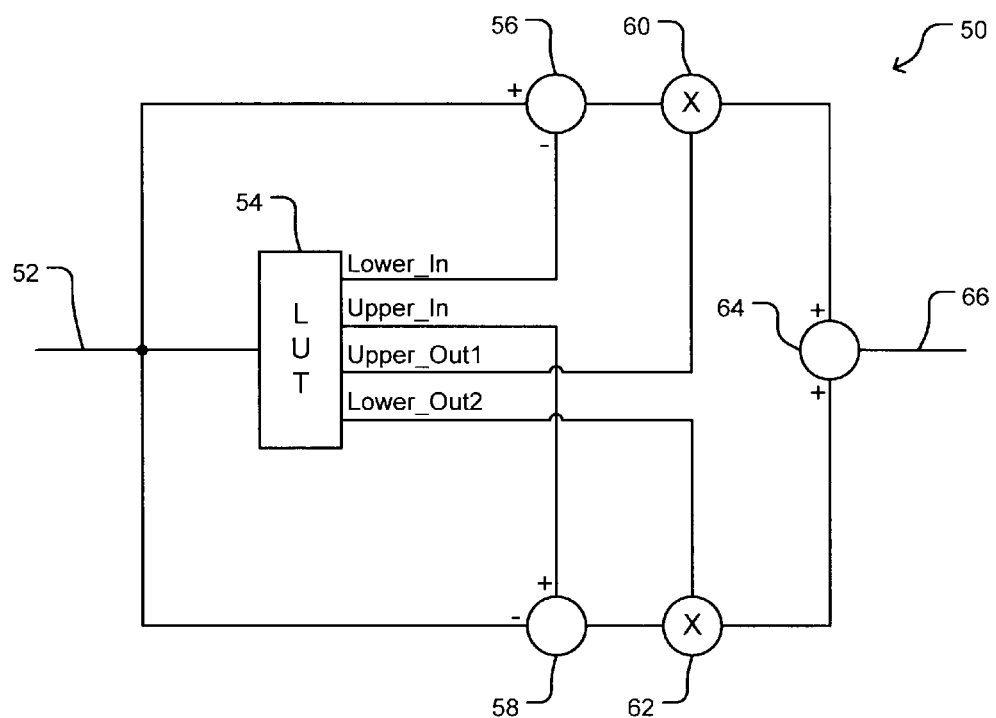
FIG. 9 shows an example signal processing circuit which employs a dual output LUT.

FIG. 9 shows an example signal processing circuit 50. Circuit 50 comprises an input 52 connected to receive an input signal. Input 52 is connected to provide the input signal to a dual output LUT 54, and first and second subtractors 56 and 58. When the input signal is received at dual output LUT 54, a deterministic search is performed to identify the two input entries having values closest to that of the input signal (the "lower" and "upper" input entries). The lower input entry (Lower_In) is subtracted from the input signal at first subtractor 56 to produce a first difference, which is provided to a first multiplier 60. The input signal is subtracted from the upper input entry (Upper_In) at second subtractor 58 to produce a second difference, which is provided to a second multiplier 62.

First multiplier 60 receives the first output entry for the upper input entry (Upper_Out1) from dual output LUT 54, which is multiplied by the first difference received from first subtractor 56 to produce a first product. Second multiplier 62 receives the second output entry for the lower input entry (Lower_Out2) from dual output LUT 54, which is multiplied by the second difference received from second subtractor 58 to produce a second product. The first and second products are provided to adder 64 and added to produce an output signal, which is provided to an output 66. If the input signal happens to be equal to one of the input entries of the table, one of the first and second multipliers 60 and 62 will receive a zero input, and thus the output signal will be provided by the product from the other of the first and second multipliers 60 and 62. As one skilled in the art will appreciate, the output signal will thus be equivalent to the result of a linear interpolation which could have been conducted using the lower and upper input and output entries of a standard LUT, but no divides are required to obtain the output signal when applying dual output LUT 54.

Figure 10:
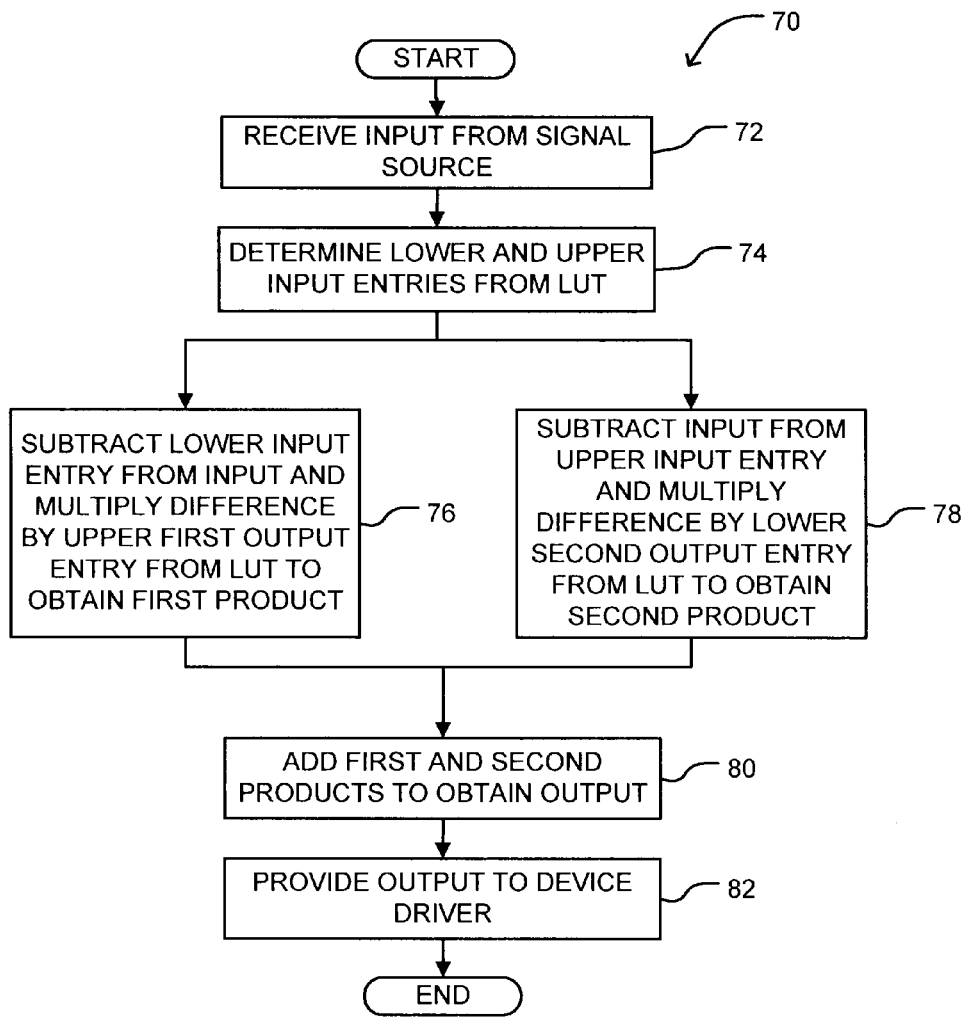
FIG. 10 is a flowchart depicting an example method of applying a dual output LUT.

FIG. 10 is a flowchart illustrating an example method 70 of applying a dual output LUT to produce an output signal for controlling a device. At step 72, an input signal is received from a signal source. At step 74, the lower and upper input entries are determined. At step 76, the lower input entry is subtracted from the input signal, and the difference is multiplied by the first output entry for the upper input entry to obtain a first product. At step 78, the input signal is subtracted from the upper input entry, and the difference is multiplied by the second output entry for the lower input entry to obtain a second product. Steps 76 and 78 are shown side by side in FIG. 10 to indicate that these steps may be performed concurrently. Alternatively one of steps 76 and 78 may be performed first, then the other may be performed. At step 80 the first and second products produced in steps 76 and 78 are added to produce an output signal. At step 82, the output signal is provided to a device driver for controlling the device.

Apparatus and methods according to aspects of the invention described above may, for example and without limitation be embodied in semiconductor chips, integrated circuits, field programmable gate arrays, and the like. Apparatus for processing signals according to certain aspects of the invention may be incorporated into video signal processing systems for display devices, including, without limitation, LCD displays, LED displays, plasma displays, or other types of displays. In some embodiments, apparatus according to the invention may be incorporated into dual modulation display devices having a spatially variable backlight comprising an array of individually controllable light sources which illuminates a front panel an array of individually controllable light transmitting elements, with separate signal processing circuits provided for the light sources of the backlight and the light transmitting elements of the front panel.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of generating a dual output lookup table for use in processing an input signal to produce an output signal for by a processor for controlling a device having a non-linear response curve, the method comprising:
   for the processor in communication with a look up table, performing the following steps:
   receiving data representing the non-linear response curve, the data comprising a plurality of input values each having a corresponding output value, wherein each input entry corresponds to an input value of a non-linear response curve, each input value having a corresponding output value defined by the non-linear response curve and further wherein the input entries are selected such that an output difference between an interpolated output value between any two adjacent input values and a corresponding actual output value of the non-linear response curve is less than a threshold;
   forcing the received data to be monotonically increasing;
   selecting a number of points along the non-linear response curve and storing the input values of the selected points as input entries of the dual output lookup table; and
   for each input entry of the dual output lookup table:
   generating a first output entry by dividing the output value corresponding to the input value stored as the input entry by a difference between the input value stored as the input entry and the input value stored as a next lower input entry; and
   generating a second output entry by dividing the output value corresponding to the input value stored as the input entry by a difference between the input value stored as a next higher input entry and the input value stored as the input entry.

2. A method according to claim 1 wherein selecting the number of points comprises selecting points separated by different intervals.

3. A method according to claim 1 wherein selecting the number of points comprises:
   (a) selecting a first point and a candidate point for a next point;
   (b) calculating an output difference between an interpolated output value for an input value falling between the first point and the candidate point with a corresponding actual output value of the data representing the non-linear response curve;
   (c) selecting a point further along the non-linear response curve as the candidate point if the output difference is less than a threshold;
   (d) repeating steps (a)-(c) until the difference exceeds the threshold; and,
   (e) assigning a previous candidate point as the next point.

4. A method according to claim 1 wherein forcing the received data to be monotonically increasing comprises, for a non-monotonic value which is less than a preceding value, searching the data for a subsequent value which is higher than the preceding value and replacing the non-monotonic value with an interpolated value based on the preceding value and the subsequent value.

5. A method according to claim 1 wherein forcing the received data to be monotonically increasing comprises, for a non-monotonic value which is less than a preceding value, replacing the non-monotonic value with a value which exceeds the preceding value by a predetermined amount.

6. A method of generating a dual output lookup table for use in processing an input signal to produce an output signal for by a processor for controlling a device having a non-linear response curve, the method comprising:
   for the processor in communication with a look up table, performing the following steps:
   receiving data representing the non-linear response curve, the data comprising a plurality of input values each having a corresponding output value, wherein each input entry corresponds to an input value of a non-linear response curve, each input value having a corresponding output value defined by the non-linear response curve and further wherein the input entries are selected such that an output difference between an interpolated output value between any two adjacent input values and a corresponding actual output value of the non-linear response curve is less than a threshold;
   selecting a number of points along the non-linear response curve and storing the input values of the selected points as input entries of the dual output lookup table, wherein selecting a number of points further comprises:
   (a) selecting a first point and a candidate point for a next point;
   (b) calculating an output difference between an interpolated output value for an input value falling between the first point and the candidate point with a corresponding actual output value of the data representing the non-linear response curve;
   (c) selecting a point further along the non-linear response curve as the candidate point if the output difference is less than a threshold;
   (d) repeating steps (a)-(c) until the difference exceeds the threshold; and,
   (e) assigning a previous candidate point as the next point; and
   for each input entry of the dual output lookup table:
   generating a first output entry by dividing the output value corresponding to the input value stored as the input entry by a difference between the input value stored as the input entry and the input value stored as a next lower input entry; and
   generating a second output entry by dividing the output value corresponding to the input value stored as the input entry by a difference between the input value stored as a next higher input entry and the input value stored as the input entry.

7. A method according to claim 6 wherein selecting the number of points comprises selecting points separated by different intervals.

8. A method according to claim 6 comprising forcing the received data to be monotonically increasing.

9. A method according to claim 8 wherein forcing the received data to be monotonically increasing comprises, for a non-monotonic value which is less than a preceding value, searching the data for a subsequent value which is higher than the preceding value and replacing the non-monotonic value with an interpolated value based on the preceding value and the subsequent value.

10. A method according to claim 8 wherein forcing the received data to be monotonically increasing comprises, for a non-monotonic value which is less than a preceding value, replacing the non-monotonic value with a value which exceeds the preceding value by a predetermined amount.

* * * * *